MAGNETIC THIN FILM SHIFT REGISTER

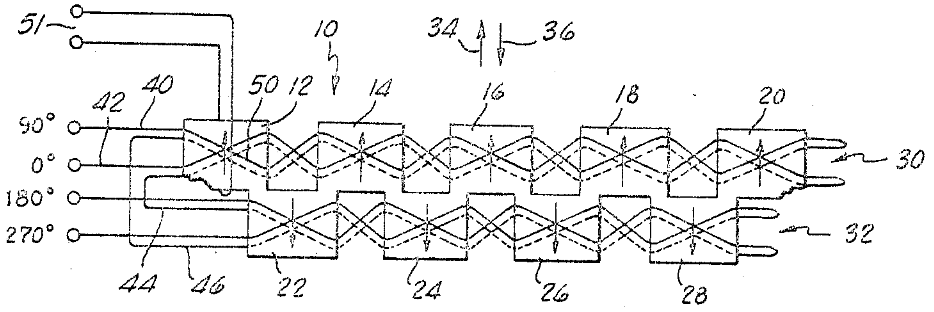
FIG. 1
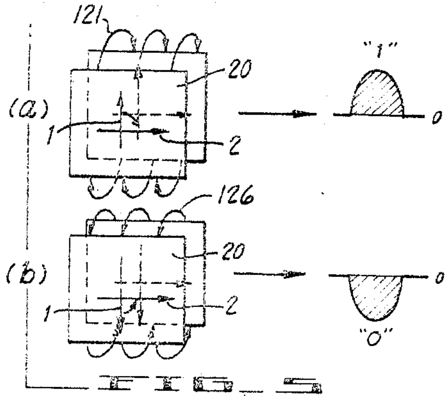
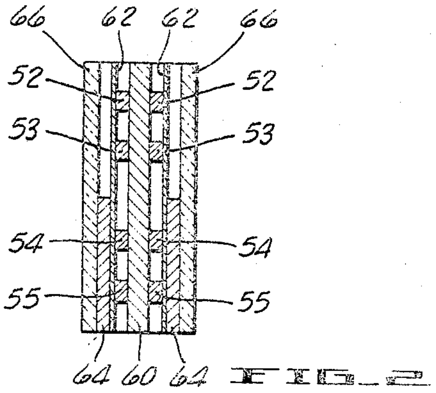
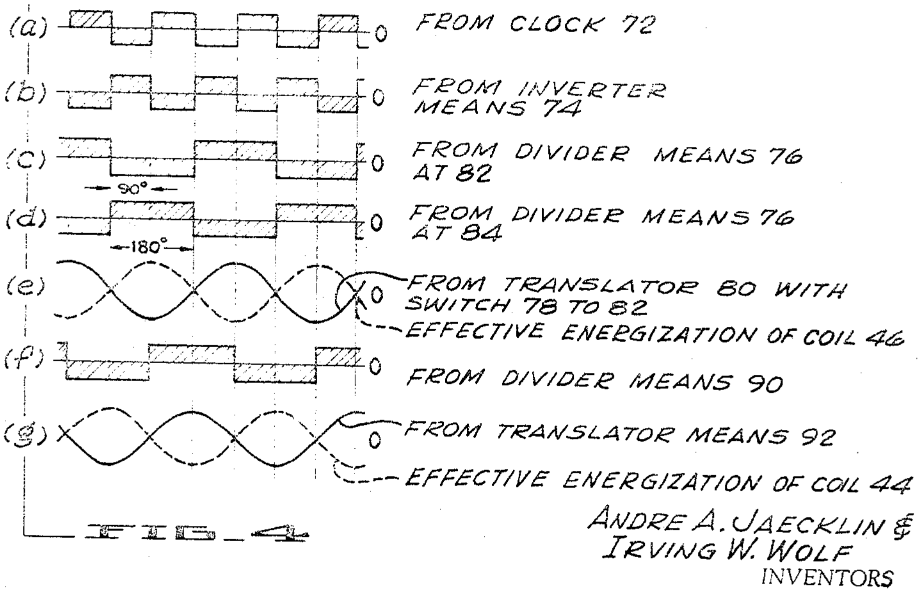
FIG. 4
ANDRE A. JAECKLIN &
IRVING W. WOLF
INVENTORS
BY Stuart Lubitz
ATTORNEY Feb. 11, 1969 I. W. WOLF ET AL 3,427,603

Filed Aug. 4, 1964 Sheet 2 of 2

ANDRE A. JAECKLIN &
IRVING W. WOLF
INVENTORS

BY Stuart Lubitz
ATTORNEY 3,427,603
MAGNETIC THIN FILM SHIFT REGISTER
Irving William Wolf and Andre A. Jaecklin, Palo Alto, Calif., assignors to Ampex Corporation, Redwood City, Calif., a corporation of California
Filed Aug. 4, 1964, Ser. No. 387,426
U.S. Cl. 340—174 6 Claims
Int. Cl. G11b *5/20;* G11c *11/02*

ABSTRACT OF THE DISCLOSURE

A thin magnetic film memory having a multi-level array of magnetic bit sites magnetically coupled to each other, and including novel means for applying a magnetic field comprising shifting or propagating coils of an improved configuration. The shifting coils on each level are arranged in a zig-zag arrangement to enable domain wall movement to take place bi-directionally depending on how the coils are energized.

This invention relates to a memory device and more particularly to a thin magnetic film memory wherein the transfer of information is facilitated by a novel means for applying a magnetic field to the thin film.

Within the past ten years there has been a large interest in thin magnetic film memories. This interest has been generated by a desire to reduce the cost of completely wired core memories and to improve the performance of such widely used arrangements. Core memories also appear to be approaching their technical limit as to speed of operation so that there is a need for a new elemental arrangement which has a higher limit. In addition, core arrays are exceedingly difficult to manufacture. These arrays require the most careful threading operations. The fabrication cost associated with the threading operation has regularly decreased, but the cost improvement now seems to have leveled off. A wired core array may now cost anyhwere from a cent to five cents a bit.

Thin magnetic film memories are one approach to overcoming the above shortcomings. There are generally two classes of thin film memory devices. Those that rely primarily upon rotational magnetic switching and those that rely mainly upon domain wall motion. Many of the former class of devices are made from discrete thin film elements while the later class of thin film devices include continuous film arrangements. The discrete element device is exemplified by U.S. Patent 3,113,297 issued to W. Dietrich on Dec. 3, 1963 while the continuous film device is shown in U.S. Patents 2,984,825 issued to H. W. Fuller, et al. on May 16, 1961, 3,092,813 issued to K. D. Broadbent on June 4, 1963, and 2,919,432 issued to K. D. Broadbent on Dec. 29, 1959. The longer list of patents pertaining to continuous film devices is included because it is that type of device that this invention is primarily concerned with.

The above cited patents and other prior art publication recognize that the creating of a reverse domain requires a greater magnetic field than the propagation of a domain. The switching of a magnetic domain by the rotational process is a substantially different technique. In the prior art patents domain growth or wall movement takes place along a substantially continuous longitudinal member. The control of the movement of the domains (propagation) and the creation of domains in a continuous member has been a major problem in prior art devices. For example, U.S. Patent 3,092,813 issued to K. A. Broadbent (columns 2–4) sets forth the problem and attempts to solve it by employing a longitudinal member with a magnetically hard border and a magnetically soft central information channel. This arrangement may minimize the existence of spurious domains and enable the use of a greater margin between the propagating field and the creating field. The Broadbent patents does not, however, provide a means for conveniently and precisely controlling the domain configuration and the domain wall motion along the continuous film. In addition, the domain walls which are irregularly shaped require an excess area to insure that the particular domain is contained within a given location. This tends to limit packing densities.

Another approach to controlling wall motion is shown in U.S. Patent 2,984,825 issued to H. W. Fuller et al. on May 16, 1961. The technique disclosed therein uses a storage thin film and a scanning thin film. The Bloch wall of the scanning film switches the domains in the storage thin film while the variation of the velocity of the Bloch wall across the scanning thin film may function as a readout means. The control of the velocity of the Bloch wall in the scanning film presents a substantial problem (see column 8 of the patents).

U.S. Patent 3,113,297 issued to W. Dietrich on Dec. 3, 1963 is a typical teaching of the use of the magnetic rotational process in a thin film memory. This patent discloses a control film element and a controlled film element. The field of the control element is coupled to the controlled element so that when the controlled element is magnetized in an easy direction and has a magnetic field applied to it and removed, the return orientation in the easy direction is determined by the direction of magnetization of the control element. (It is understood that there are at least two opposed easy directions.) The steps of magnetizing the controlled element followed by the return to an easy direction are time consuming and power consuming steps. These steps require considerable logic circuitry when the device is to be used in a shift register or a linear select memory.

The invented thin memory solves the above discussed problems of wall motion control by providing a thin film geometry which limits and controls the travel of a domain and enables one site or domain to influence the adjacent site or domain. The influence of one side upon an adjacent site will reinforce the adjacent sites magnetization if in the same direction. The existence of an oppositely magnetized adjacent domain will cause a reverse nucleate or more particularly enable the formation of minute oppositely orientated domains in the adjacent site. This nucleate transfer will enable the magnetization of the reverse nucleated site to be switched by wall motion and by a relatively low value magnetic propagating field. Without the reverse nucleate present, the magnetic field necessary to cause switching is much larger and the application of a propagating field would have little effect on the site. This principle was first described in U.S. patent application Ser. No. 387,427 filed on Aug. 4, 1964 in the name of Irving Wolf. This invention utilizes the basic invention and in addition provides means for the bi-directional movement of the nucleate transfer process and provides precise control of the process.

The invented thin film memory like the one disclosed in the aforementioned patent application enables low manufacturing costs and high speeds of operation. The low cost is attributable to the simplicity of the geometry which enables simple wiring and mass production by vacuum deposition or electro-deposition techniques. The speed of operation is limited only by the domain wall velocity.

Briefly, the structure of the invention comprises a checkerboard or multi-level array of magnetic sites magnetically coupled to one another and a pair of shifting or propagating coils coupled to each level or checkerboard line. The shifting coils on each level are arranged in a zig-zag or criss-cross arrangement to enable the domain wall movement to take place from right to left or left to right depending on the manner in which the coils are energized. The details of this construction will be readily understood when the detailed description is read in conjunction with the drawings wherein:

FIGURE 1 is a schematic top view of the magnetic thin film array;

FIGURE 2 is a sectional view showing a typical construction of a double layer thin film structure;

FIGURE 4 is a plurality of waveform diagrams showing the waveforms supplied to various parts of the system shown in FIGURE 3; and FIGURE 5 is a schematic illustration of the magnetic switching that occurs during readout.

Figure 3:
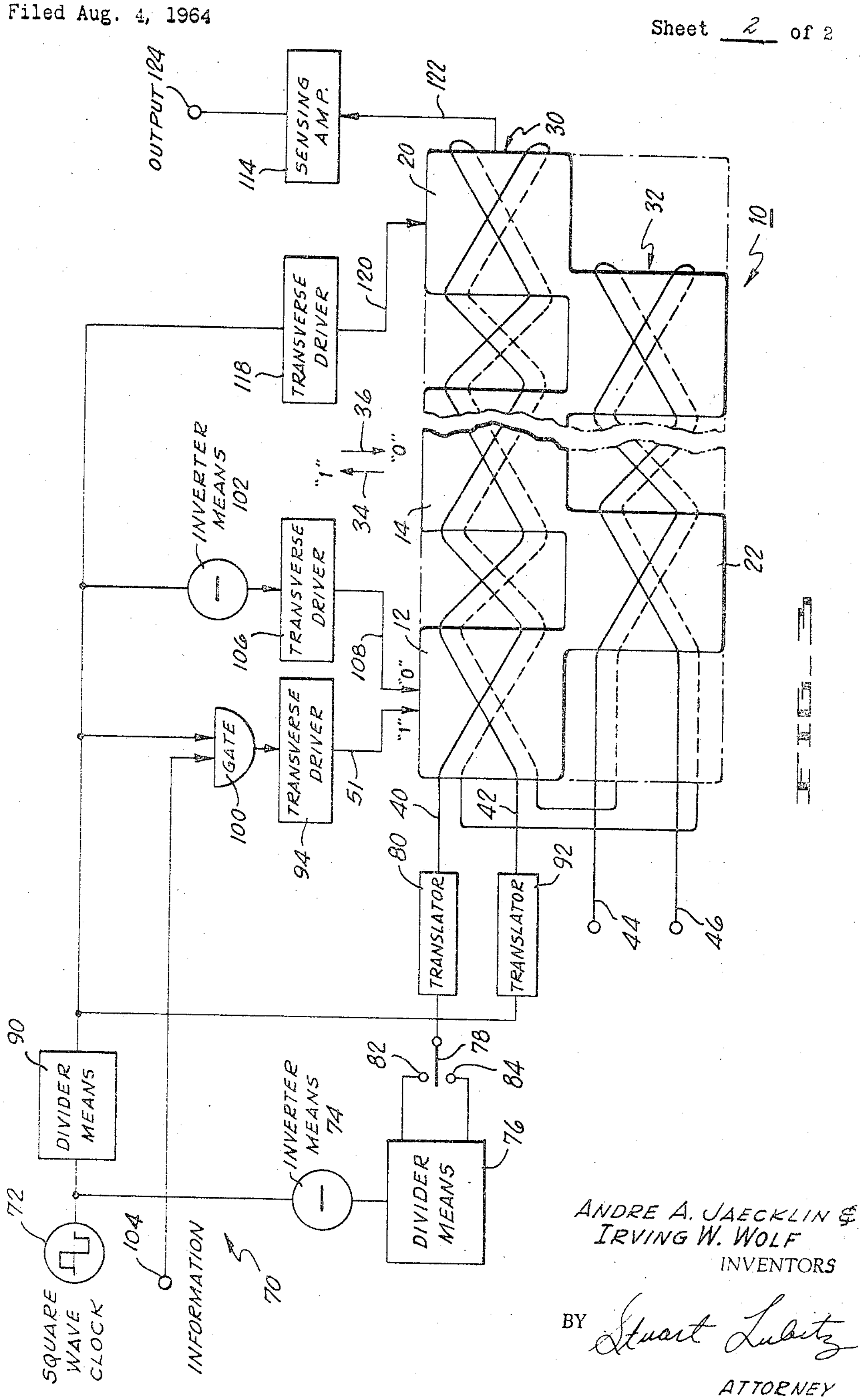
FIGURE 3 is a block diagram of a system incorporating the invented magnetic thin film array.

Referring to FIGURE 1 a thin film memory 10 is shown comprising a plurality of magnetic thin film sites 12–28 arranged in a multiple level checkerboard array. The embodiment shown in FIGURE 1 has a first level 30 and a second level 32. It is, of course, within the scope of the invention to have any number of levels in the array. Each of the sites 12–28 has a first preferred direction of magnetization such as indicated by arrow 34 and a second preferred direction of magnetization such as indicated by arrow 36. For the purposes of this description the arrow 34 is designated as the "one" direction and the arrow 36 is designated as the "zero" direction. Such a thin magnetic film may typically be a deposited magnetic material such as Fe, Ni, Co, Mn, Bi or alloys thereof which have been correctly treated to obtain in either direction of magnetization in a first or second preferred direction. When an easy direction of magnetization is obtained the electron spins are substantially aligned parallel to an axis of preferred alignment and are capable of being magnetized to saturation along said easy axis to form a single magnetic domain.

The two levels 30 and 32 of magnetic sites are arranged in a configuration with the corners of adjacent elements connected through a small area. The area of contact between the adjacent elements may approach one-half the width of the site but is preferably about one-eighth the length of the site or less. It should be understood that a particular area of contact between the adjacent element is not critical to the invention although it may be advantageous under certain circumstances to have a given area of contact. Moreover, it is within the broad aspect of the invention to have the adjacent elements, such as 12 and 22, separated by a gap and only magnetically linked by a field which bridges this gap. It is also within the scope of the invention to vary the thickness of the magnetic film at the gap of contact area or to alter its composition at the contact area. Such modifications may be utilized to facilitate the control of the nucleate transfer process.

Sites 12–28 have magnetic field means, such as coils 40–46, coupled thereto for applying a magnetic field to the sites in a first preferred direction and a second preferred direction. Each level of sites 30 or 32 has a plurality of coils 40 and 42 or 44 and 46 for applying a magnetic field simultaneously to each site on a level. Coils 40–46, as shown in FIGURE 1, have each coil wound about each level with a part of the coil on each side of the thin film and with one end of a coil on one level continuous with a coil on another level. It is within the scope of the invention to use only wire or one part of the coil to apply a magnetic field to both sides of the film. In the case of a thin film structure comprising two thin films in back to back relationship the field from one wire which is applied to one film will close or flow through the other film to magnetize it. The one wire arrangment may be made continuous with one wire at another level. Coils 40–46 are oriented across each site in a manner to cause magnetic domain movement in a particular direction along the array and through the contact areas connecting the two adjacent sites. For example, coils 40 and 42 are arranged in a criss-cross arrangement which causes the magnetic domains to move the right when energized with electrical waveforms having a given phase relationship. (The energization of the coils 40 and 42 as well as the coils 40 and 46 will be considered later in the specification when the system of FIGURE 3 is considered in detail.) If a "one" domain nucleate 34 is present at any spot of site 12, a positive current in coil 42 tends to cause a domain wall movement so that the whole of site 12 will be magnetized in direction 34. Coil 40 with its lower extremity, such as 50, adjacent to the contact area tends to cause the magnetic domain to move through the gap area. The magnetizing action of coils 40 and 42 are only effective with regards to site 12 when the write coil 51 is energized coincidently with the proper energization of coil 40 and 42. This is because there is no adjacent site on one side of site 12 from which a nucleate transfer may be accomplished.

The significance of the arrangement of coil means 40–46 can be further appreciated by considering a site such at site 22 on the second level 32 of the array. Considering site 22, coil 44 when energized to cause magnetization in the direction of arrow 34 will result in the domain wall moving in an upward direction (provided a reverse nucleate is present). No meaningful nucleate transfer to adjacent site 12 is accomplished as it is already magnetized in the direction of arrow 34. Coil 46, having a portion adjacent the contact area containing sites 14 and 22 moves the domain wall through this contact area to nucleate site 14. When coils 44 and 46 are energized in a reverse sequence a nucleate will tend to be transferred from site 22 through the contact area connecting sites 12 and 22.

Referring to FIGURE 2 a typical film structure for the array of FIGURE 1 is shown, wherein however the FIGURE 2 embodiment has a double layer film or magnetic site configuration. This film structure includes copper conductors 52–55 formed on a Mylar base 60. Each conductor forms a continuous coil member around two sides of the Mylar base 60. These conductors may be formed by well known vacuum deposition techniques. A very thin silicon monoxide insulating layer 62 overlies the conductors 52–55 which may also be formed by vacuum deposition techniques. A thin magnetic film 64 of deposited permalloy or other appropriate magnetic material is located adjacent each of the silicon monoxide layers 62 and each film is associated with one-half of the coils 52–54. It should be noted that one of each coil may be eliminated if the one wire structure previously discussed is utilized. A pair of protective and supporting substrates 66 are associated with each of the thin films 64. Vacuum deposition or evaporation techniques are well known in the art as evidenced by such publications as "Preparation of Thin Magnetic Films and their Properties," by M. S. Blois, Jr., Journal of Applied Physics, vol. 26, August 1955, pp. 975–980 and "Vacuum Deposition of Thin Films," by L. Holland, John Wiley and Son (1956). The use of two stacked thin magnetic films 64 provides a substantially continuous path for the fields stored in sites 12–28 which enables the demagnetizing edge effect to be minimized. Further, the entire film structure may be fabricated by vacuum deposition techniques consistent with the mass production of memory arrays.

The invented magnetic film memory is shown incorporated in a system in FIGURE 3. This system incorporates an energizing means 70 for energizing the plurality of coils 40–46. The energizing means 70 includes a signal generator means, such as square wave clock 72, for generating a particular waveform having a given frequency. The clock 72 is coupled to coil 40 via an inverter means 74, a divider means 76, switch means 78 and translator or electronic filter 80. Coil 42 is also coupled to clock 72 via divider means 90 and translator or electronic filter 92. With regard to coil 40 the output from clock 72 (FIGURE 4*a*) is transmitted to inverter means 74 where the phase of the supplied square wave is shifted one-hundred and eighty electrical degrees (FIGURE 4*b*). This shifted electrical waveform is supplied to divider means 76 which may take the form of a conventional flip-flop having a plurality of outputs 82 and 84. The switch means 78 is connectable to the flip-flop outputs 82 or 84. These outputs will supply signals one-hundred and eighty degrees out of phase, that is, the signal supplied at the output terminal 82 will have a first electrical waveform with the signal supplied to the output terminal 84 having a similar waveform shifted one-hundred and eighty degrees (FIGURES 4*c* and 4*d*). Further, when the switch is connected to either output 82 or 84 the waveform supplied thereto will have one-half the frequency of the waveform supplied by inverter means 74. The translator 80 extracts the fundamental sine wave from the square wave fed to it by divider 76 and supplies a sinusoidal waveform to coil 40. Divider means 90, connected to clock 72, may also be a flip-flop supplying a waveform to translator 92 with one-half the frequency of the waveform generated by clock 72. The translator 92 in turn supplies a sinusoidal waveform to coil 42. Thus the waveforms supplied to coils 40 and 42 have the same frequency and a similar shape.

The purpose of the above frequency division is to accomplish a desired phase shift with a minimum of complexity. From the comparison of the waveforms of FIGURES 4*a* and 4*b* it can be seen that the inverter means 74 cooperating with the clock 72 provides a positive half cycle every ninety electrical degrees. (The waveform supplied from divider means 76 is the basis for specifying electrical degrees with one cycle of the waveform therefrom equal to 360°.) These waveforms when applied to dividers 76 and 90 result in a frequency division with one cycle generated for each two cycles of the waveform supplied. The resulting waveforms from dividers 76 and 90 are only phase shifted ninety degrees but this is now one-half of a half cycle (FIGURES 4*c* and 4*f*).

The phase shifted waveforms shown in FIGURES 4*c* and 4*f* are supplied to translators 80 and 92 where they are amplified and filtered to take a sinusoidal form and then supplied to coils 40 and 42 respectively. Coil 40 is wound around level 30 of the array in a first direction and is continuous with coil 46 which is wound around level 32 in an opposite direction. This results in coil 46 magnetizing the sites of the level 32 as if it was energized with a waveform one-hundred and eighty degrees out of phase with the waveform supplied to coil 40. Similarly, coil 44 is continuous with coil 42 and oppositely wound with regards thereto. This results in coil 44 in effect being energized with a waveform that is one-hundred and eighty degrees out of phase with the waveform applied to coil 42 and effectively ninety degrees out of phase with the waveform applied to coil 40. Thus coils 42, 40, 46 and 44 may be regarded as energized by waveforms phase shifted ninety degrees from one another. Considering coil 42 to be at zero degrees phase shifted, the waveform applied to coil 40 is phase shifted a lagging ninety-degrees from the waveform applied to coil 42 while the waveform applied to coil 44 is lagging one-hundred and eighty degrees from the waveform applied to coil 42. The waveform applied to coil 46 is lagging two-hundred and seventy degrees from the one applied to coil 42. It should be noted that the phase relationship of the waveform supplied to coils 40 and 42 may be reversed by the switch means 78 contacting output 84 rather than output 82. The following table clearly shows what happens to the phase relationship when the output 84 is engaged:

| | Phase relationship with output 82 engaged (degrees lagging) | Phase relationship with output 84 engaged (degrees lagging) |
|---|---|---|
| Coil: | | |
| 40 | 90 | 270 |
| 42 | 0 | 0 |
| 44 | 180 | 180 |
| 46 | 270 | 90 |

This reversal of the phase relationship is important in reversing the movement of information in the thin film array from a right direction to the left direction. It will be explained later in the specification that movement to the right results when output 82 is engaged while movement to the left results when output 84 is engaged.

From the above description it can be seen that the clock 72, inverter means 74, divider means 76 and 90 and translators 80 and 92 cooperate to provide a means for energizing a plurality of coils with an electrical waveform having a predetermined phase relationship. When switch means 78 is included, a means for reversing the phase relationship is provided.

The clock 72 is also connected to transverse driver 94 via divider 90 and AND gate 100. Divider means 90 provides a properly shaped pulse and timed pulse to gate 100. Gate 100 is also connected to input terminal 104 which has input information supplied thereto. With input information and pulses from divider 90 supplied substantially simultaneously to gate 100 then transverse driver 94 will energize coil 51 with a large amplitude positive spike like pulse at about the same time as the divider 90 supplies a positive going edge. The energization of coil 51 acts in combination with the energization of coil 42 which at about the same time is energized with a positive half cycle to store a magnetic domain in a first direction in site 12 such as the direction of arrow 34.

To write information in a second direction in site 12 an inverter means 102 and transverse driver 106 are coupled to site 12. The inverter means 102 shifts the phase of the waveform supplied by divider 90 by a lagging one-hundred and eighty degrees (FIGURE 4) so that a positive going edge is supplied to transverse driver 106 at about the same time a negative half cycle is supplied to coil 42. The positive going edge causes transverse driver 106 to generate a pulse opposite in polarity to the one generated by transverse driver 94, which in this example is a negative pulse. This negative pulse supplied to coil 108 is coupled to site 12 at approximately the same time a negative half cycle is supplied by translator 92 to coil 42. The coincidence of a negative pulse and a negative half cycle results in the storage of a "zero" in site 12.

Once information is written in site 12 it may be stepped from site 12 to sites 22 and 14 and onto site 20 by the appropriate energization of coils 40–46. For example, assume that initially all the sites have a "zero" direction magnetization (direction of arrow 36). Input information representative of a "one" is then supplied to gate 100 coincident with a pulse from divider 90 enabling the transverse driver 94 to energize coil 51 with a peaked positive pulse. At this same time coil 42 is energized with a positive half cycle waveform. It will be recalled from FIGURE 4 that the coil 42 is energized with what is termed a zero degree phase shift waveform such as shown in FIGURE 4*g*. This waveform has a positive half cycle (or one with the same polarity as the waveform supplied by driver 94) that occurs substantially simultaneously with the first positive half cycle from clock 72, FIGURE 4*a* and consequently at approximately the same time as the driver 94 is enabled by divider 90 and AND gate 100. The simultaneous energization of coils 42 and 51 with the same polarity electrical waveform and pulse results in the creation of a reverse domain in site 12 or the rotational switching of this site dependent on the level of the magnetic fields supplied to these coils.

About ninety-electrical degrees after the creation of the reverse domain in site 12 coil 40 is energized with a positive half cycle from translator 80. This energization of coil 40 pushes the newly created mangetic domain through the contact area connecting sites 12 and 22, site 22 now has a reverse nucleate formed therein permitting it to have its magnetized direction switched by the application of a relatively low magnetic field such as applied by energization of coils 44 and 46. (The magnetic field required to create a reverse magnetic domain in absence of the nucleate may be in the range of 2–3 times greater than with the nucleate present.) As shown in FIGURE 4*g*, coil 44 is next energized with a positive half cycle (sine wave) which causes a magnetic field that moves the reverse magnetic nucleate within site 22. About ninety electrical degrees later coil 46 is similarly energized (FIGURE 4*e*) causing the newly created magnetic domain to move through the contact area connecting sites 22 and 14, creating a reverse magnetic nucleate in site 14. The magnetization in site 14 may now be reversed by the application of a magnetic field in the direction of the nucleate. The reversal of magnetization of site 14 is similarly carried through the contact area connecting site 14 and 24 by the sequential energization of coils 42 and 40 in that order. In this manner a magnetic domain stored in site 12 is stepped through the array to adjacent sites.

From the above explanation it should be obvious that to store a "zero" direction magnetization (in the direction of arrow 36) it is only necessary to have the driver 106 energize coil 108 with a negative pulse during the period that coil 42 is energized by a negative half cycle from the translator 92. During the subsequent negative half cycles applied to coils 40, 44 and 46 the "zero" information is stepped along the array.

A significant part of the invention is its capability to step information to the right or to the left. This bidirectional stepping of the information is accomplished by the simple alteration of moving switch means 78 into contact with the terminal 84 to reverse the phase relationship of the electrical waveforms applied to coils 40 and 42 and consequently applied to coils 44 and 46. (See table on page 13 of the specification, add 270° to each of the values stated therein and convert to a range 0°–360°.) With the phase reversal accomplished, coil 46 is first effectively supplied with a positive half cycle. Ninety degrees later coil 44 is supplied with a similar waveform. Coil 40 is energized with a similar waveform ninety degrees after coil 44 and coil 42 are energized ninety degrees after coil 42.

In operation, the energization sequence results in stepping information from the right to left. For example, with a "one" stored in site 14 and "zero" stored in the other sites, the energization of coil 46 with a positive half cycle sweeps the reverse nucleate from site 14 into site 22. The later energization of coil 44 with a positive half cycle sweeps the domain through the contact area connecting sites 22 and 12. Coils 40 and 42 are then appropriately energized in that order and the reverse nucleate is moved through site 12. In this way information is moved from the right to the left.

The information stored in the thin film array may be read out by well known readout means that include sense amplifier 114 and transverse driver 118. Referring to FIGURE 3, divider means 90 is connected to driver 118. Driver 118 is coupled to the last site in the thin film array which as shown in FIGURE 3 is site 20. Driver 118 is coupled to site 20 by coil 120. The sense amplifier 114 is coupled to site 20 by a coil 122 and strobed according to well known techniques to provide an output at output terminal 124.

The operation of the readout means can be understood by reference to FIGURES 3 and 5. Assuming a "one" to be stored in site 20, a positive pulse is supplied to coil 120 by transverse driver 118 during the same time as a positive half cycle is applied to coil 42. The concurrence of the pulse and the positive half cycle results in the rotational switching of the direction of magnetization of site 20 to a direction approximately perpendicular to the "one" direction. This is shown in FIGURE 5*a* as the movement from position one to position two in a clockwise direction. With this change in direction, the field designated by the arrows 121 disappears. The disappearance of field 121 in the direction indicated results in coil 122 and sense amplifier 114 sensing what is designated as a positive polarity pulse indicating that a "one" is stored in site 20.

As shown in FIGURE 5*b* information is read from site 20 in a similar manner to obtain a signal representative of magnetization in a "zero" direction. In the case of a domain having "zero" direction of magnetization the transverse driver 118 applies a positive pulse in the same manner as described with regards to sensing magnetization in a "one" direction. The coincidence of the positive pulse supplied by transverse driver 118 and positive half cycle supplied by coil 42 results in the switching of the direction of magnetization from position one to position two in a counter-clockwise direction. This switching causes the field 126 to disappear. The disappearance of field 126 is in an opposite direction to the disapperance of field 121 so that a pulse having an opposite polarity is sened by coil 120 and sense amplifier 114.

It should be understood that many other readout arrangements may be used consistent with the invention and that the readout means may be coupled to a site at the level 30 or 32 of the array.

In summary a magnetic thin film memory has been invented which utilizes the nucleate transfer process and enables the transfer of stored information in a bi-directional manner. The bi-directional transfer of information is in essence accomplished by magnetic field means such as coils 40–46 that are arranged to effect magnetization in a first direction along the array when energized by an energizing means which generates electrical waveforms having a first phase relationship. When this phase relationship is reversed by the simple means of altering a switch, then the magnetization along the array is in a second and opposite direction.

The specific embodiment described above for accomplishing the bi-directional movement is only exemplary in nature. This example, however, has the desirable features of being relatively simple and adapted to be constructed from well known elements. This facilitates its manufacture and minimizes its cost.

While the above detailed description has shown, described and pointed out the fundamental novel features of the invention as applied to a preferred embodiment, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. In a magnetic thin film memory including:

substrate means for supporting a thin film, and a plurality of magnetic thin film sites deposited on said substrate means in a multiple level array within a common plane, each of said sites having a first preferred direction of magnetization and a second preferred direction of magnetization, said elements arranged so that the magnetization of a first one of said sites in one of said preferred directions enables an oppositely magnetized adjacent site to be magnetically switched in the same direction as said first site by the application of a given magnetic field in the same direction as said first side, magnetic field means for applying a given magnetic field to said site in said first preferred direction and said second preferred direction, said magnetic field means comprising a plurality of coil means extending along each level for applying magnetic fields to each of said sites within the common plane, said coil means along each level being oriented to effect domain movement in a particular direction in each site when energized with electrical waveforms having a given phase relation; and energizing means for energizing said plurality of coil means with electrical waveforms having predetermined phase relationships, said energizing means coupled to said coil means.

2. The structure recited in claim 1 wherein:

said magnetic field means includes at least two coils coupled to each level of sites, wherein the two coils extend across respective levels oriented in a criss-cross relationship;

signal generator means for energizing said coils with the predetermined electrical waveforms, said signal generator means having an output coupled to one of said coils associated with a level of sites; and phase shifter means for shifting the electrical waveform of the output of said signal generator means a predetermined number of electrical degrees, said phase shifter means coupled to the other of said two coils associated with a level of sites and coupled to the output of said signal generator means.

3. The structure recited in claim 2 wherein the two coils which extend along their respective level of successive magnetic sites criss-cross each site with substantially similar orientation, wherein selectively energizing the two coils provides switching of the magnetization within the sites in an associated direction.

4. The structure recited in claim 2 wherein said two coils associated with one level of sites are continuously positioned around a second level of sites in an opposite sense.

5. The structure recited in claim 4 wherein said signal generator means comprises a square wave generator means for generating a square waveform having at least twice the frequency of the waveform that is to energize said coil means; and said phase shifter means comprising an inverter means for shifting the phase of said square waveform and flip-flop means coupled to said inverter means and said coil means for energizing said coil means at the desired frequency.

6. The structure recited in claim 5 wherein said flip-flop means is coupled to said coil means by a switch means for reversing the phase of the output from said flip-flop means and a translator means for forming the output of said flip-flop means into a sinusoidal waveform.

References Cited

UNITED STATES PATENTS

| | | | |
|---|---|---|---|
| 3,328,783 | 6/1967 | Stemme | 340—174 |
| 3,113,297 | 12/1963 | Dietrich | 340—174 |

JAMES W. MOFFITT, *Primary Examiner.*